United States Patent
Liu et al.

(10) Patent No.: US 11,575,695 B2
(45) Date of Patent: Feb. 7, 2023

(54) SYSTEMS AND METHODS FOR INTELLIGENTLY CONSTRUCTING A BACKBONE NETWORK GRAPH AND IDENTIFYING AND MITIGATING DIGITAL THREATS BASED THEREON IN A MACHINE LEARNING TASK-ORIENTED DIGITAL THREAT MITIGATION PLATFORM

(71) Applicant: Sift Science, Inc., San Francisco, CA (US)

(72) Inventors: Wei Liu, Seattle, WA (US); Nicholas Benavides, San Francisco, CA (US); Yanqing Bao, Nashville, TN (US); Gary Lee, Brooklyn, NY (US); Amey Farde, Sunnyvale, CA (US); Kostyantyn Gurnov, San Francisco, CA (US); Ralf Gunter Correa Carvalho, Seattle, WA (US)

(73) Assignee: Sift Sciences, Inc., San Francisco, CA (US)

( * ) Notice: Subject to any disclaimer, the term of this patent is extended or adjusted under 35 U.S.C. 154(b) by 0 days.

(21) Appl. No.: 17/730,780

(22) Filed: Apr. 27, 2022

(65) Prior Publication Data

US 2022/0329608 A1  Oct. 13, 2022

Related U.S. Application Data

(63) Continuation-in-part of application No. 17/693,851, filed on Mar. 14, 2022.
(Continued)

(51) Int. Cl.
*H04L 9/40* (2022.01)

(52) U.S. Cl.
CPC ...... *H04L 63/1416* (2013.01); *H04L 63/1441* (2013.01)

(58) Field of Classification Search
CPC ............... H04L 63/1416; H04L 63/1441
See application file for complete search history.

(56) References Cited

U.S. PATENT DOCUMENTS 10,938,853 B1 * 3/2021 Zablocki ............. H04L 63/1458
2009/0299967 A1 * 12/2009 Li .......................... G06Q 30/02
(Continued)

FOREIGN PATENT DOCUMENTS

CN          112396160 A  *  2/2021  ............... G06K 9/62

OTHER PUBLICATIONS

Translation of CN 112396160A by Sun et al, Feb. 2021, p. 1-32.*
(Continued)

*Primary Examiner* — Christopher A Revak
(74) *Attorney, Agent, or Firm* — Padowithz Alce; Chandler Scheitlin; Alce PLLC

(57) ABSTRACT

A system and method for fast-detection and mitigation of emerging network fraud attacks includes sourcing digital event data samples associated with one or more online services; executing graph-rendering computer instructions that automatically construct a backbone graph using a subset of features extracted from the sourced digital event data samples, wherein the constructing includes: identifying, as graphical nodes, a first plurality of distinct features of the subset of features; identifying, as graphical edges, a second plurality of distinct features of the subset of features; generating a graphical edge between distinct pairs of graphical nodes comprising a same type of feature of the subset of features based on feature values associated with at least one distinct feature of the second plurality of distinct features; and mitigating, via a digital threat mitigation action, if one or more emerging network fraud attacks is identified based on an assessment of a cluster of networked nodes.

18 Claims, 10 Drawing Sheets

Related U.S. Application Data

(60) Provisional application No. 63/192,316, filed on May 24, 2021, provisional application No. 63/170,427, filed on Apr. 2, 2021.

(56) References Cited

U.S. PATENT DOCUMENTS

| | | | |
|---|---|---|---|
| 2014/0283026 A1* | 9/2014 | Striem Amit | H04L 63/1416 |
| | | | 726/22 |
| 2019/0207960 A1* | 7/2019 | Chu | G06N 20/00 |
| 2020/0210833 A1* | 7/2020 | Xu | G06N 3/0427 |
| 2021/0019762 A1* | 1/2021 | Bosnjakovic | G06N 5/022 |
| 2021/0397669 A1* | 12/2021 | Finkelshtein | G06N 5/003 |
| 2021/0409439 A1* | 12/2021 | Engelberg | H04L 63/145 |
| 2022/0114183 A1* | 4/2022 | Paul | G06F 16/9024 |
| 2022/0224707 A1* | 7/2022 | Kapoor | H04L 43/045 |

OTHER PUBLICATIONS

Taguchi et al, "Graph conventional networks for graphs containing missing features", Dec. 1, 2020, Future Generations Computer Systems 117, p. 155-168.*

* cited by examiner

Identifying Event Data S210

Identifying Attributes Associated with the Event Data S215

Constructing one or more Data Structures S220

Constructing a BackBone Network Graph based on the one or more Data Structures S230

Deriving Connected Component(s) based on the Backbone Network Graph S240

Deploying the BackBone Network Graph and/or the Connected Component Graph S250

FIGURE 2

SYSTEMS AND METHODS FOR INTELLIGENTLY CONSTRUCTING A BACKBONE NETWORK GRAPH AND IDENTIFYING AND MITIGATING DIGITAL THREATS BASED THEREON IN A MACHINE LEARNING TASK-ORIENTED DIGITAL THREAT MITIGATION PLATFORM

CROSS-REFERENCE TO RELATED APPLICATIONS

This application claims the benefit of U.S. Provisional Application No. 63/192,316, filed 24 May 2021, and is a continuation-in-part of U.S. patent application Ser. No. 17/693,851, filed 14 Mar. 2022, which claims the benefit of U.S. Provisional Application No. 63/170,427, filed 2 Apr. 2021, which are incorporated herein in their entireties by this reference.

TECHNICAL FIELD

This invention relates generally to the digital fraud and abuse field, and more specifically to a new and useful system and method for detecting digital fraud or digital abuse and evolving underlying machine learning models in the digital fraud and abuse field.

BACKGROUND

The modern web and Internet enables entities to engage and perform an incalculable number of activities. Many of these activities involve user-to-user activities, user-to-business activities (or the reverse), and the like. These activities between users and between users and organizational entities over the web often involve the access, use, and/or exchange of information by one or more of the parties of the activities. Because of the malleable nature of the digital realm that these activities operate within, there arise a countless number of digital threats by digital actors that aim to commit digital fraud and/or digital abuse using online services and/or Internet-accessible applications (e.g., web or mobile applications). Additionally, some of these bad digital actors may also aim to misappropriate the information (e.g., hack) being exchanged between legitimate entities to these activities. These digital threats may also be perpetrated by malicious third parties who seek to unlawfully or otherwise, impermissibly take advantage of the data or information that is exchanged or, if not exchanged, data or information about the activities or actions of users and/or businesses on the web.

Other digital threats involving a malicious party or a bad digital actor that acts unilaterally (or in concert with other malicious actors) to abuse digital resources of a service provider to perpetrate fraud or other unlawful activities that are also of significant concern to legitimate service providers and users of the Internet.

While there may currently exist some technologies that attempt to detect digital fraud and digital abuse or other malicious digital activities over the Internet, these existing technology implementations may not sufficiently detect malicious digital activities over the Internet with accuracy and in real-time to provide an opportunity for an appropriate response by an affected party. Additionally, these existing technology implementations lack the capabilities to detect new and/or never been encountered before digital threats and automatically (or near automatically) evolve the technology implementation to effectively respond and neutralize the digital threats.

Therefore, there is a need in the digital fraud and abuse field for a digital fraud and abuse solution that enables effective detection of multiple and specific digital threats involving digital fraud and/or digital abuse via digital resources of a service provider. The embodiments of the present application described herein provide technical solutions that address, at least, the need described above.

BRIEF SUMMARY OF THE INVENTION(S)

In one embodiment, a method for fast-detection and mitigation of emerging network fraud attacks implemented via a machine learning-based digital threat mitigation platform includes: sourcing, from one or more digital event data corpora, a plurality of distinct digital event data samples associated with one or more online services; executing, by one or more computers, graph-rendering computer instructions that automatically construct a digital event feature-based backbone network graph (backbone network graph) using a subset of features extracted from the plurality of distinct digital event data samples, wherein the constructing includes: identifying, as graphical nodes of the backbone network graph, a first plurality of distinct features of the subset of features; identifying, as graphical edges of the backbone network graph, a second plurality of distinct features of the subset of features; generating a graphical edge between distinct pairs of graphical nodes comprising a same type of feature of the subset of features based on feature values associated with at least one distinct feature of the second plurality of distinct features, wherein the graphical edge is generated between a target pair of graphical nodes of the distinct pairs of graphical nodes if a feature value of the at least one distinct feature satisfies a node-pairing threshold; identifying a distinct cluster of networked nodes comprising a subset of the backbone network graph based on feature-derived search parameters; and mitigating, via executing one or more digital threat mitigation actions, if one or more emerging network fraud attacks is identified based on an assessment of the distinct cluster of networked nodes.

In one embodiment, the method further includes displaying, on a web-based user interface, the distinct cluster of networked nodes; and while displaying the distinct cluster of networked nodes: receiving a user input selecting a target graphical node of the distinct cluster of networked nodes; in response to receiving the user input, displaying a user interface object that includes: a feature value encoded within the target graphical node, and a quantity of distinct feature values of a first feature type of the first plurality of distinct features graphically connected to the target graphical node.

In one embodiment, the method further includes wherein the user interface object further includes a selectable option, the method further comprising: receiving a second user input selecting the selectable option; and in response to receiving the second user input: automatically assigning a classification label indicating digital abuse to at least a subset of the first plurality of distinct features associated with one or more graphical nodes graphically connected to the target graphical node.

In one embodiment, the method further includes based on receiving the second user input: preventing one or more future digital events from being processed to completion on the one or more online services if one or more pieces of metadata of the one or more future digital events is equivalent to one of the distinct features of the subset that have classification label indicating digital abuse.

In one embodiment, the method includes wherein the first plurality of distinct features of the subset of features are distinct from the second plurality of distinct features of the subset of features.

In one embodiment, the method includes wherein identifying the first plurality of distinct features of the subset of features includes identifying distinct internet protocol-based features of the subset of features to be represented as distinct IP-type graphical nodes in the backbone network graph; identifying distinct user identification-based features of the subset of features to be represented as distinct user-type graphical nodes in the backbone network graph; identifying distinct phone number-based features of the subset of features to be represented as distinct phone number-type graphical nodes in the backbone network graph; identifying distinct email address-based feature of the subset of features to be represented as distinct email-type graphical nodes in the backbone network graph; identifying distinct physical address-based features of the subset of features to be represented as distinct address-type graphical nodes in the backbone network graph; identifying distinct payment method-based features of the subset of features to be represented as distinct payment method-type graphical nodes in the backbone network graph; and identifying distinct order transaction-based features of the subset of features to be represented as distinct order-type graphical nodes in the backbone network graph.

In one embodiment, the method includes wherein the distinct cluster of networked nodes includes (a) one or more distinct graphical nodes of a first feature type, (b) one or more distinct graphical nodes of a second feature type, (c) one or more distinct graphical nodes of a third feature type, the method further comprising: displaying, on a web-based user interface, the distinct cluster of networked nodes; and while displaying the distinct cluster of networked nodes: receiving a user input selecting a target graphical node included in the distinct cluster of networked nodes; and in response to receiving the user input, visually emphasizing the one or more distinct graphical nodes of the first feature type graphically connected to the target graphical node.

In one embodiment, the method includes wherein identifying the distinct cluster of networked nodes includes constructing a search query comprising the feature-derived search parameters and executing the search query.

In one embodiment, the method includes wherein the distinct cluster of networked nodes includes a distinct graphical node of a first feature type encoded with a distinct feature value associated with the first feature type that is graphically connected to a plurality of distinct graphical nodes of a second feature type, wherein each of the plurality of distinct graphical nodes of the second feature type is encoded with a distinct feature value associated with the second feature type.

In one embodiment, a method for fast-detection and mitigation of emerging network fraud attacks implemented via a machine learning-based digital threat mitigation platform includes sourcing, from one or more digital event data corpora, a plurality of distinct digital event data samples that occurred on one or more online services of a target subscriber; identifying a graph schema data structure of a plurality of distinct graph schema data structures based on the plurality of distinct digital event data samples satisfying one or more characteristics of the graph schema data structure, wherein the graph schema data structure includes a set of graph-rendering computer instructions for constructing a digital event feature-based backbone network graph; automatically constructing, by one or more computers, the digital event feature-based backbone network graph by executing the set of graph-rendering computer instructions of the graph schema data structure on the plurality of distinct digital event data samples, wherein the constructing includes: selectively extracting a distinct set of feature values from each of the plurality of distinct digital event data samples, wherein each extracted feature value of each distinct set of feature values corresponds to one of a plurality of distinct node types defined by the graph schema data structure; generating a plurality of distinct graphical nodes for each distinct node type of the graph schema data structure based on the distinct sets of feature values; generating a plurality of graphical edges that graphically connects selective subsets of the plurality of distinct graphical nodes of distinct node types together in accordance with the graph schema data structure; identifying a distinct cluster of networked nodes comprising a subset of the backbone network graph; and mitigating, via executing one or more digital threat mitigation actions, if an emerging network fraud attack is identified based on an assessment of the distinct cluster of networked nodes.

In one embodiment, the method includes wherein automatically constructing the digital event feature-based backbone network graph occurs at a first period; and identifying the distinct cluster of networked nodes occurs at a second period, distinct from the first period.

In one embodiment, the method includes wherein the distinct cluster of networked nodes is identified based on a plurality of new graphical edges being constructed within the distinct cluster of networked nodes within a predetermined time span; and the distinct cluster of networked nodes is identified as an emerging network fraud attack based on the plurality of new graphical edges exceeding a service-defined edge creation count.

In one embodiment, the method includes wherein the distinct cluster of networked nodes includes (a) a plurality of graphical nodes of a first type, (b) a plurality of graphical nodes of a second type; and a plurality of graphical nodes of a third type, the method further comprising: displaying, on a web-based user interface, the distinct cluster of networked nodes; and while displaying the distinct cluster of networked nodes: receiving a user input selecting a target graphical node included in the distinct cluster of networked nodes; in response to receiving the user input, visually emphasizing the plurality of graphical nodes of the first type connected to the target graphical node.

In one embodiment, the method includes wherein the graph schema data structure includes representing: distinct internet protocol-based features of the plurality of distinct digital event data samples as distinct IP-type graphical nodes, distinct user identification-based features of the plurality of distinct digital event data samples as distinct user-type graphical nodes, distinct phone number-based features of the plurality of distinct digital event data samples as distinct phone number-type graphical nodes, distinct email address-based feature of the plurality of distinct digital event data samples as distinct email-type graphical nodes, distinct physical address-based features of the plurality of distinct digital event data samples as distinct address-type graphical nodes, distinct payment method-based features of the plurality of distinct digital event data samples as distinct payment method-type graphical nodes, and distinct order transaction-based features of the plurality of distinct digital event data samples as distinct order-type graphical nodes.

In one embodiment, the method includes wherein identifying the distinct cluster of networked nodes includes querying the digital event feature-based backbone network graph based on feature-derived search parameters, and the distinct cluster of networked nodes includes a distinct feature value of a first feature type digitally mapped to a plurality of distinct feature values of a second feature type.

In one embodiment, the method further includes displaying, on a web-based user interface, the distinct cluster of networked nodes; and while displaying the distinct cluster of networked nodes: receiving a user input selecting a target graphical node of a first node type included in the distinct cluster of networked nodes; in response to receiving the user input, displaying a user interface object that includes: a feature value encoded within the target graphical node, and a quantity of distinct feature values of a second node type distinct from the first node type graphically connected to the target graphical node.

In one embodiment, the method includes wherein the distinct cluster of networked nodes is identified as an emerging network fraud attack based on the quantity of distinct feature values of a second node type graphically connected to the target graphical node exceeding a service-defined count threshold.

In one embodiment, the method includes wherein each distinct graphical node of the distinct cluster of networked nodes is encoded or configured to store a distinct feature value.

In one embodiment, a method for fast-detection and mitigation of emerging network fraud attacks implemented via a machine learning-based digital threat mitigation platform includes sourcing, from one or more digital event data corpora, a plurality of distinct digital event data samples that occurred on one or more online services of one or more target subscribers; automatically constructing, by one or more computers, the digital event feature-based backbone network graph based on executing a set of graph-rendering computer instructions of a target graph schema on the plurality of distinct digital event data samples; identifying a distinct cluster of networked graphical nodes comprising a subset of the digital event feature-based backbone network graph, wherein each distinct graphical node of the distinct cluster of networked graphical nodes is encoded with a distinct digital event feature value; simultaneously assigning, by the one or more computers, a classification label indicating digital abuse to at least a subset of the distinct digital event feature values associated with the distinct cluster of networked graphical nodes; and constructing a labeled digital event data corpus that includes the subset of distinct digital event feature values that have the classification label indicating digital abuse.

In one embodiment, the method further includes training one or more machine learning-based models with batches of labeled training data samples sourced from the labeled digital event data corpus.

BRIEF DESCRIPTION OF THE FIGURES

FIG. 2 illustrates an example method in accordance with one or more embodiments of the present application;

DESCRIPTION OF THE PREFERRED EMBODIMENTS

Figure 1:
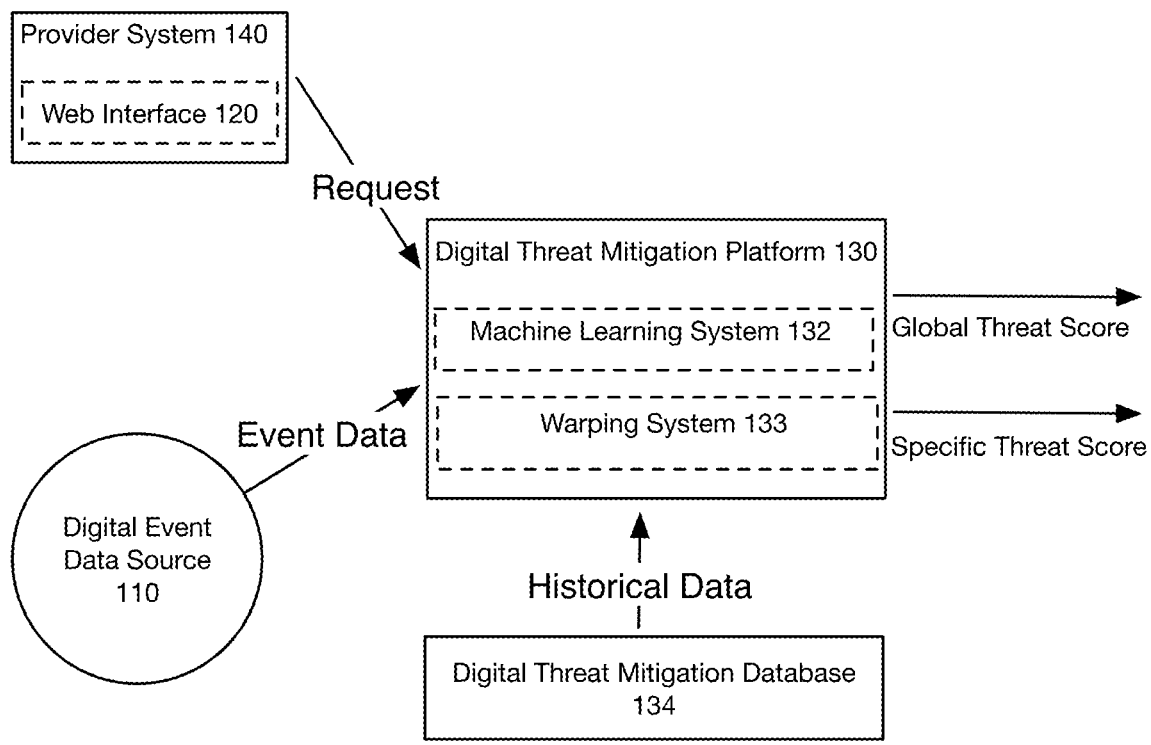
FIG. 1 illustrates a schematic representation of a system in accordance with one or more embodiments of the present application.

The following description of the preferred embodiments of the present application are not intended to limit the inventions to these preferred embodiments, but rather to enable any person skilled in the art to make and use these inventions.

Overview

As discussed above, digital threats are abounding and continue to evolve to circumvent existing digital fraud detection technologies. The evolving nature of digital threats compounded with the great number of transactions, events, actions, and/or activities (exceeding billions in number) occurring over the web and/or Internet highlight the many deficiencies of traditional digital fraud detection and threat mitigation implementations.

The embodiments of the present application, however, provide an advanced technology platform that is capable of ingesting billions of digital events and/or transactions over the Internet, the web, web applications, mobile applications, and the like and dynamically implement digital threat mitigation implementations that are capable of detecting malicious activities, fraudulent activities, digital abuses and generate digital threat mitigation recommendations and responses that operate to mitigate and/or eliminate the digital fraud and abuse threats stemming from the malicious or fraudulent activities, as described in U.S. Pat. No. 9,954,879, which is incorporated herein in its entirety by this reference.

The advanced technology platform of many embodiments of the present application employs a robust ensemble of machine learning models and related systems that operate to ingest the great number of digital activities performed and events occurring over the web. Accordingly, using these finely tuned and perpetually evolving and tunable machine learning models, a system implementing the several embodiments of the present application can predict a threat level and/or classify a digital threat with high accuracy and, in some embodiments, in real-time (e.g., as the event is occurring or shortly thereafter) compute a digital threat score for each event or activity that is received by the system.

The digital threat score may be exposed via a score application program interface (API) that may function to interact with various endpoints of the digital threat mitigation platform. Specifically, the score API may function to interact with one or more computing servers that implement the ensembles of machine learning models used to predict a likelihood of digital fraud and/or digital abuse. The score API may function to return a value (e.g., a number, likelihood or probability, or other criterion) that indicates how likely it is that an actor involved or associated with digital events and/or activities is a malicious actor or may be perpetrating cyber fraud or digital abuse (e.g., payment abuse, etc.). Accordingly, the digital threat score calculated by the score API may be used in several manners including to inform digital event data processing decisions (e.g., deny, hold, or approve digital transaction) or to define which of one or more digital threat mitigation protocols or implementations that should be applied to future digital event data and/or the current digital events to mitigate or eliminate a digital threat associated therewith. Additionally, or alternatively, in one or more embodiments, digital event data processing decisions may be automated via automated decisioning workflows, as described in U.S. Pat. No. 9,954,879, which is incorporated herein in its entirety by this reference and digital event data processing decisions may be performed with manual input from one or more human analysts or the like. In such embodiments, decisions output from one or more review queues of the one or more human analysts may be converted to training data for training and improving one or more threat classifying models of the threat mitigation service including, but not limited to, a unified threat model.

1. System for Machine Learning-Based Identification of Digital Fraud and/or Abuse Detection As shown in FIG. 1, a system 100 for detecting digital fraud and/or digital abuse includes one or more digital event data sources 110, a web interface 120, a digital threat mitigation platform 130, and a service provider system 140.

The system 100 functions to enable a prediction of multiple types of digital abuse and/or digital fraud within a single stream of digital event data. The system 100 provides web interface 120 that enables subscribers to and/or customers of a threat mitigation service implementing the system 100 to generate a request for a global digital threat score and additionally, make a request for specific digital threat scores for varying digital abuse types. After or contemporaneously with receiving a request from the web interface 120, the system 100 may function to collect digital event data from the one or more digital event data sources no. The system 100 using the digital threat mitigation platform 130 functions to generate a global digital threat score and one or more specific digital threat scores for one or more digital abuse types that may exist in the collected digital event data.

The one or more digital event data sources 110 function as sources of digital events data and digital activities data, occurring fully or in part over the Internet, the web, mobile applications, and the like. The one or more digital event data sources no may include a plurality of web servers and/or one or more data repositories associated with a plurality of service providers. Accordingly, the one or more digital event data sources no may also include the service provider system 140.

The one or more digital event data sources 110 function to capture and/or record any digital activities and/or digital events occurring over the Internet, web, mobile applications (or other digital/Internet platforms) involving the web servers of the service providers and/or other digital resources (e.g., web pages, web transaction platforms, Internet-accessible data sources, web applications, etc.) of the service providers. The digital events data and digital activities data collected by the one or more digital event data sources 110 may function as input data sources for a machine learning system 132 of the digital threat mitigation platform 130.

The digital threat mitigation platform 130 functions as an engine that implement at least a machine learning system 132 and, in some embodiments, together with a warping system 133 to generate a global threat score and one or more specific digital threat scores for one or more digital abuse types. The digital threat mitigation platform 130 functions to interact with the web interface 120 to receive instructions and/or a digital request for predicting likelihoods of digital fraud and/or digital abuse within a provided dataset. The digital threat mitigation engine 130 may be implemented via one or more specifically configured web or private computing servers (or a distributed computing system) or any suitable system for implementing system 100 and/or method 200.

The machine learning system 132 functions to identify or classify features of the collected digital events data and digital activity data received from the one or more digital event data sources no. The machine learning system 132 may be implemented by a plurality of computing servers (e.g., a combination of web servers and private servers) that implement one or more ensembles of machine learning models. The ensemble of machine learning models may include hundreds and/or thousands of machine learning models that work together to classify features of digital events data and namely, to classify or detect features that may indicate a possibility of fraud and/or abuse. The machine learning system 132 may additionally utilize the input from the one or more digital event data sources 110 and various other data sources (e.g., outputs of system 100, system 100 derived knowledge data, external entity-maintained data, etc.) to continuously improve or accurately tune weightings associated with features of the one or more of the machine learning models defining the ensembles.

The warping system 133 of the digital threat mitigation platform 130, in some embodiments, functions to warp a global digital threat score generated by a primary machine learning ensemble to generate one or more specific digital threat scores for one or more of the plurality of digital abuse types. In some embodiments, the warping system 133 may function to warp the primary machine learning ensemble, itself, to produce a secondary (or derivative) machine learning ensemble that functions to generate specific digital threat scores for the digital abuse and/or digital fraud types. Additionally, or alternatively, the warping system 130 may function to implement a companion machine learning model or a machine learning model that is assistive in determining whether a specific digital threat score should be generated for a subject digital events dataset being evaluated at the primary machine learning model. Additionally, or alternatively, the warping system 133 may function to implement a plurality of secondary machine learning models defining a second ensemble that may be used to selectively determine or generate specific digital threat scores. Accordingly, the warping system 133 may be implemented in various manners including in various combinations of the embodiments described above.

The digital threat mitigation database 134 includes one or more data repositories that function to store historical digital event data. The digital threat mitigation database 134 may be in operable communication with one or both of an events API and the machine learning system 132. For instance, the machine learning system 132 when generating global digital threat scores and specific digital threat scores for one or more specific digital abuse types may pull additional data from the digital threat mitigation database 134 that may be assistive in generating the digital threat scores.

The ensembles of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation form transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, GPT, GPT-2, GPT-3, ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be implemented in the various systems and/or methods described herein.

The service provider 140 functions to provide digital events data to the one or more digital event data processing components of the system 100. Preferably, the service provider 140 provides digital events data to an events application program interface (API) associated with the digital threat mitigation platform 130. The service provider 140 may be any entity or organization having a digital or online presence that enable users of the digital resources associated with the service provider's online presence to perform transactions, exchanges of data, perform one or more digital activities, and the like.

The service provider 140 may include one or more web or private computing servers and/or web or private computing devices. Preferably, the service provider 140 includes one or more client devices functioning to operate the web interface 120 to interact with and/or communication with the digital threat mitigation engine 130.

The web interface 120 functions to enable a client system or client device to operably interact with the remote digital threat mitigation platform 130 of the present application. The web interface 120 may include any suitable graphical frontend that can be accessed via a web browser using a computing device. The web interface 120 may function to provide an interface to provide requests to be used as inputs into the digital threat mitigation platform 130 for generating global digital threat scores and additionally, specific digital threat scores for one or more digital abuse types. Additionally, or alternatively, the web (client) interface 120 may be used to collect manual decisions with respect to a digital event processing decision, such as hold, deny, accept, additional review, and/or the like. In some embodiments, the web interface 120 includes an application program interface that is in operable communication with one or more of the computing servers or computing components of the digital threat mitigation platform 130.

The web interface 120 may be used by an entity or service provider to make any suitable request including requests to generate global digital threat scores and specific digital threat scores. In some embodiments, the web interface 120 comprises an application programming interface (API) client and/or a client browser.

2. Method for Constructing One or More Digital Event-Based Graphical Models for Intelligently Identifying Digital Fraud and/or Digital Abuse As shown in FIG. 2, a method 200 for constructing one or more digital event-based graphical models for intelligently identifying digital fraud and/or digital abuse may include identifying digital event data samples S210, constructing one or more digital event data structures S220, constructing a backbone network graph based on the one or more digital event data structures or the identified digital event data samples S230, deriving connected component(s) based on the backbone network graph S240, and deploying the backbone network graph and/or the connected component graph S250. The method 200 may optionally include identifying attributes or metadata associated with the identified digital event data samples S215.

2.10 Identifying Digital Event Data Samples

S210, which includes identifying digital event data, may function to periodically or continuously collect and/or source digital event data occurring over the internet from one or more online services of one or more subscribers to the digital threat mitigation platform. Digital event data, as generally referred to herein, may preferably relate to data associated with a digital event or digital activity that may occur over the Internet, however, in one or more alternative embodiments, digital event data may also include data associated with events that may occur or are initiated outside of the internet, in which, some part of the event involves the Internet. It shall be noted that identifying digital event data may preferably include identifying a plurality of event attributes (or event characteristics or event metadata) associated with each digital event.

For instance, in one or more embodiments, sourcing or identifying digital event data samples may preferably include identifying one or more event attributes (or event metadata) associated with a subject digital event such as a first attribute that may indicate the digital user (e.g., user identification, user account data, or the like) attempting to perform the subject digital event, a second attribute that may indicate an email address of the digital user attempting to perform the subject digital event, a third attribute that may indicate a shipping address provided by the digital user, a fourth attribute that may indicate information about a credit card provided by the digital user, a fifth attribute that may relate to an electronic device (e.g., device identification) involved in performing the subject digital event, a sixth attribute that may relate to an IP address of the electronic device when the subject digital event was performed, a seventh attribute that may relate to which user session the digital user performed the subject digital event (e.g., user session identification), and/or the like. Additionally, or alternatively, in one or more embodiments, S210 may function to identify additionally, fewer, or different event (metadata) attributes from each digital event, such as, including, but not limited to, a session identification (session ID), a user identification (user ID), an account identifier, a transaction identification (transaction ID), a type of digital event (e.g., transaction-type digital events), an item of interest, a type of internet browser, a country of origin, an event status, an internet protocol (IP) address, a billing address, a shipping address, or the like.

In one or more embodiments, event data may be identified (or collected) based on activity occurring in one or more online resources of one or more subscribers (e.g., online service or resource providers). For instance, in one or more implementations, S210 may function to identify digital event data by collecting, sourcing, and/or identifying activity (e.g., digital events) occurring at one or more online resources of one or more subscribers utilizing the system 100 and/or the method 200. It shall be noted that the identified event data associated with the one or more subscribers may be in a raw data state (e.g., non-labeled data, non-classified data, devoid of data tags, etc.).

In operation, S210 may function to identify digital event data in a variety of forms based upon the deployment (or utilization) of a system (e.g., the system 100 implementing the method 200). In a first implementation, S210 may function to identify digital event data samples from a plurality of distinct subscribers and construct one or more corpora of digital event data comprising the identified digital event data samples. In such implementation, and as further discussed below, the system 100 (implementing the method 200) may use the one or more corpora of digital event data to achieve a global network advantage to combat both small- and large-scale digital fraud attacks (or digital threats).

Alternatively, in a second implementation, S210 may function to construct a corpus of digital event data samples isolated or confined to a subscriber-specific environment. In such implementation, the system 100 (implementing the method 200) may be deployed or utilized locally for a target subscriber to combat both small- and large-scale digital fraud attacks (or digital threats).

At least one technical benefit of S210, may be to provide a data foundation (or base) for the system 100 and/or the method 200 to construct graphical representations of digital event data (e.g., fraud-based event data, digital event data, order transaction digital event data, or the like) to identify and/or mitigate digital threats, as described in more detail herein.

Retrieving Digital Event Data Samples

In one or more embodiments, S210 may function to collect (or identify) digital event data samples in an offline setting, such that the event data includes historical digital event data samples of one or more subscribers that may have been collected and stored during a historical period. In preferred embodiments, S210 may function to collect (or identify) digital event data samples from one or more subscribers in an online or real-time setting, such that the digital event data samples from the one or more subscribers includes current or (e.g., near) real-time event data being actively collected by the threat system/threat service implementing the method 200.

2.15 Identifying Digital Event Attributes or Digital Event Metadata Associated with the Digital Event Data Samples|Distillation of Digital Event Data Optionally, S210 includes S215, which includes identifying attributes (or characteristics or metadata) associated with the identified digital event data samples by S210, may function to selectively extract a subset of digital event metadata of the plurality of digital event metadata collected with each identified digital event data sample. In a preferred embodiment, S215 may function to identify a subset of fundamental digital event attributes that may be used downstream for constructing graphical representations of the identified digital event data. Stated another way, in one or more embodiments, S215 may function to selectively extract a distinct set of feature values from each of the plurality of distinct digital event data samples sourced by S210 based on a target graph schema data structure.

In one or more embodiments, S215 may function to identify, for each digital event data sample identified by S210, a subset of event attributes, which may also be referred to herein as "event features" or "event metadata." For instance, in a non-limiting example, S215 may function to extract or collect one or more of an internet protocol-based feature (e.g., IP address or the like), a user identification-based feature (e.g., user ID or the like), a phone number-based feature (e.g., a phone number or the like), an email address-based feature (e.g., an email address or the like), a physical address-based feature (e.g., a shipping address, a billing address, and/or the like), a payment method-based feature (e.g., credit card number or the like), order transaction-based features (e.g., order ID, type of order, etc), device identifier-based features (e.g., computer ID, mobile device ID, etc.), the type of event, and/or the time stamp of the digital event corresponding to each distinct digital event identified by S210. Thereafter, S215 may function to optionally construct a condensed (e.g., less complex) digital event data signal, including the subset of digital event attributes associated with each digital event data sample for increased efficiency in data processing.

Figure 6:
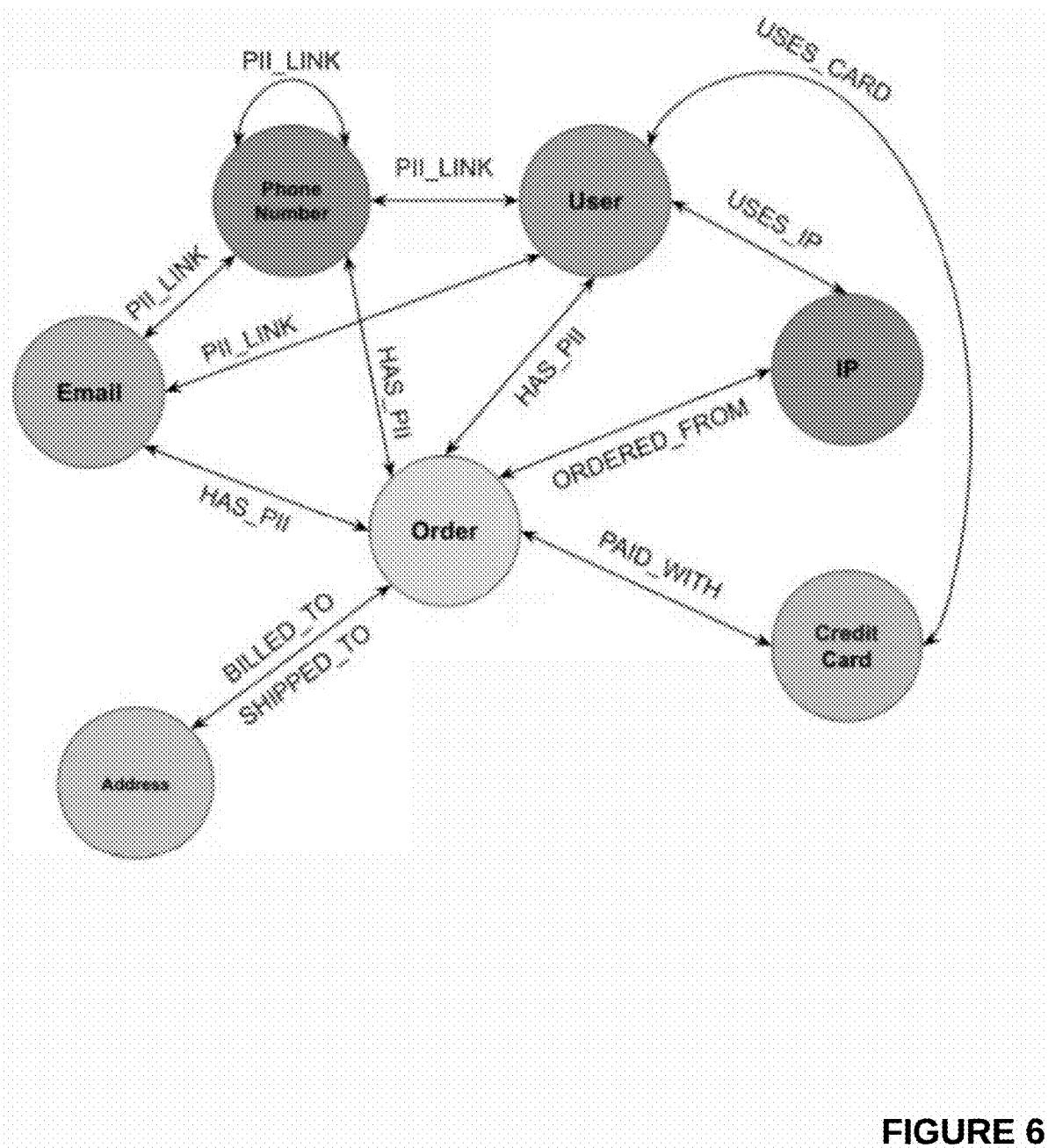
FIG. 6 illustrates an exemplary representation of a graph schema data structure in accordance with one or more embodiments of the present application.

As will be described in more detail herein, in one or more embodiments, each extracted feature value may correspond to one of a plurality of distinct node types defined by a target graph schema data structure. For instance, in a non-limiting example, S215 may function to extract a first feature type (e.g., IP-based features) from the digital event data samples that may correspond to a first node type (e.g., an IP-type node) of the target graph schema; a second feature type (e.g., user-based features) from the digital event data samples that may correspond to a second node type (e.g., a user-type node) of the target graph schema; a third feature type (e.g., phone number-based features) from the digital event data samples that may correspond to a third node type (e.g., a phone number-type node) of the target graph schema; a fourth feature type (e.g., email-based features) from the digital event data samples that may correspond to a fourth node type (e.g., an email-type node) of the target graph schema; a fifth feature type (e.g., address-based features) from the digital event data samples that may correspond to a fifth node type (e.g., an address-type nodes) of the target graph schema; a sixth feature type (e.g., credit card-based features) from the digital event data samples that may correspond to a sixth node type (e.g., a credit card-type node) of the target graph schema; and a seventh feature type (e.g., order-based features) from the digital event data samples that may correspond to a seventh node type (e.g., an order-type node) of the target graph schema, as shown generally by way of example in FIG. 6.

Additionally, or alternatively, in one or more embodiments, S215 may function to distill a continuous, uninterrupted stream of digital event data comprising a plurality of distinct events and a plurality event attributes (or metadata) associated with each distinct event identified by S210. In other words, S215 may function to condense (or simplify) the continuous, uninterrupted data stream of event data comprising the plurality of event attributes for increased efficiency in data processing. In such embodiments, the condensed or simplified data stream of event data may include only a subset of necessary event (metadata) attributes of the plurality of event attributes (e.g., one or more of the above-mentioned metadata features).

As will be further discussed in a downstream operation (e.g., in S220), a system (e.g., the system 100 implementing the method 200) may function to identify (or extract) the subset of event attributes from each digital event data samples collected or sourced by S210 to construct one or more data structures based on the identified (or extracted) digital event metadata.

2.20 Constructing Digital Event Data Structures

S220, which includes constructing one or more digital event data structures, may function to construct one or more digital event data structures based on the identified (or sourced) digital event data samples of S210. In a preferred embodiment, the one or more digital event data structures may be constructed by associating at least one digital event attribute type with at least one other distinct digital event attribute type for each identified digital event of S210. For instance, in one or more embodiments, one or more digital event data structures may be constructed that may include associating a location-based digital event attribute type (e.g., an internet protocol (IP) address, a shipping address, a billing address, device ID, or the like) to a user-based digital event attribute type (e.g., a user profile, a user identification, a user email, a user account, or the like).

In one or more embodiments, the one or more data structures constructed by S220 may be associative data structures that intelligently associate attributes of digital event data samples that may be required for deriving and/or building IP-based graphical representations, user-based graphical representations, and/or digital event-based graphical representations having a high probability (e.g., a probability of threat satisfying or exceeding a minimum threat threshold or the like) of IPs, online users, card numbers, or any other digital event attributes that may pose a probable threat to a subscriber.

User-Indexed Associative Data Structure(s)‖ User-Based Event Attributes-to-Location-Based Event Attributes In a first exemplary data structure, S220 may function to construct a data table (e.g., a digital event data structure) that may index (or map) one or more user-based event attributes to one or more location-based event attributes for the plurality of digital event data samples identified by S210. In such data table (or data structure), S220 may function to index (or map) one or more users and/or one or more user devices-to-one or more IP addresses based on sharing one or more characteristics.

Figure 3:
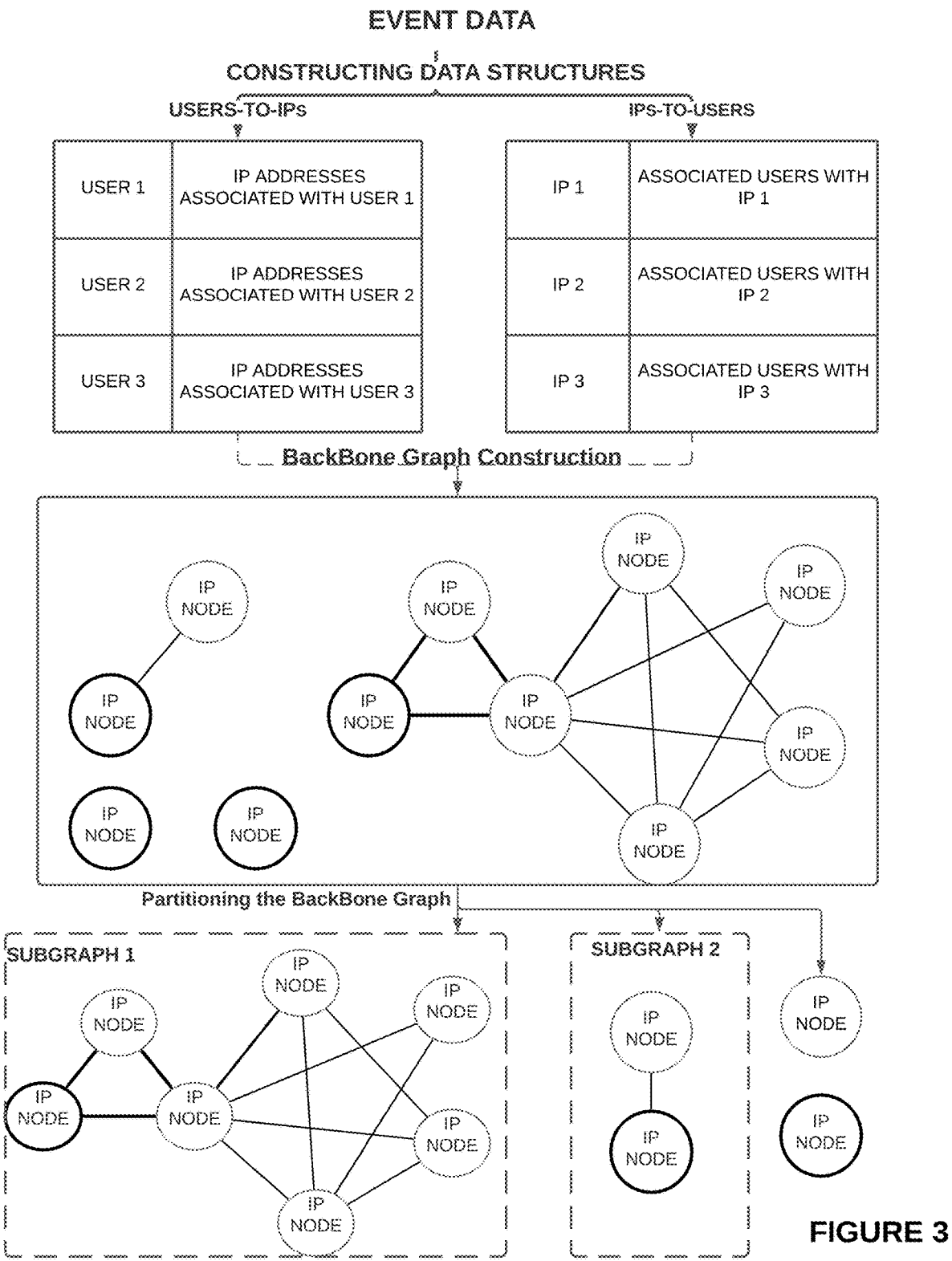
FIG. 3 illustrates an exemplary representation of constructing and partitioning a backbone network graph in accordance with one or more embodiments of the present application.

It shall be noted that constructing the first exemplary data structure that may index (or map) users and/or user devices-to-IP addresses may be generated and/or constructed in real-time. That is, S220 may function in real-time (or at least near real-time) to construct an index (or mapping) of users and/or user devices-to-IP addresses based on the identified event data of S210. For example, S220 may function to create an entry in the first exemplary data structure by indexing (or mapping) a user ID (e.g., user 1) with one or more distinct IP addresses (e.g., IP address 1, IP address 2, IP address 3). In such example, each distinct user or user identifier may be indexed with a distinct entry within the first data structure, wherein each user entry may then be mapped or associated with one or multiple IP addresses based on the digital event data and sharing one or more characteristics, as shown generally by way of example in FIG. 3.

In such example, as additional real-time digital event data may be collected and stored in the first data structure, the prior real-time event data may continue to be stored within the first exemplary data structure. Additionally, construction of the first exemplary data structure may not be limited to only collecting real-time event data and may also function to identify (or collect) historical event data (e.g., event data occurring in the past).

In operation, the first exemplary data structure (e.g., users and/or user devices-to-IP addresses), may be used as input into a graph-based construction algorithm that, when executed by one or more computers of the digital threat mitigation platform, may function to translate the first data structure into a digital event feature-based graphical structure comprising nodes and edges in accordance with an identified or selected graph schema data structure.

Additionally, in one or more embodiments, S220 may function to identify and/or track a time component (e.g., a time stamp) for each indexing (or mapping) of the one or more user-based event attributes-to-the one or more location-based event attributes.

It shall be noted that S220 may function to create or construct multiple, distinct user-indexed data structures that may function to create indices in which a user or user identifier may be distinctly or individually provided as an entry within a data structure in which each user entry may have pointers or associations to multiple instances of an attribute of event data.

IP-Indexed Associative Data Structures‖ Location-Type Event Attributes-to-User-Type Event Attributes Additionally, or alternatively, in a second exemplary data structure, S220 may function to construct a data table (e.g., a data structure) that may index (or map) one or more location-type digital event attributes to one or more user-type event attributes of the plurality of events identified by S210. In one or more embodiments of such data structure, S220 may function to index (or map) a plurality of location-type event attributes (e.g., a plurality of IP addresses, a plurality of shipping addresses, a plurality of billing addresses, or the like) to a plurality of users and/or a plurality of user devices.

It shall be noted that constructing the second exemplary data structure that may index (or map) IP addresses-to-users and/or user devices may be constructed in real-time. That is, S220 may function in real-time (or at least near real-time) to construct an indexing (or mapping) of IP addresses-to-users and/or user devices based on the identified digital event data of S210. For instance, S220 may function to create an entry within the second exemplary data structure by indexing (or mapping) an IP address (e.g., IP address 1) with one or more distinct users (e.g., user 1, user 2, user 3, user 4, and user 5) based on sharing one or more characteristics.

In such example, as additional real-time event data may be collected and stored in the second data structure, the prior real-time event data may continue to be stored within the second exemplary data structure. Additionally, or alternatively, construction of the second data structure may not be limited to only collecting real-time event data and may also function to identify (or collect) historical event data (e.g., event data occurring in the past).

In operation, the second data structure (e.g., IP addresses-to-users and/or user devices), may be used as input into a graph-based construction algorithm that, when executed, may function to translate the second data structure into a graphical structure comprising nodes and edges in accordance with an identified or selected graph schema data structure.

Additionally, or optionally, S220 may function to identify and/or track a time component (e.g., a time stamp) for each indexing (or mapping) of the one or more location-type event attributes-to-the one or more user-type event attributes.

Digital Event Metadata Associative Data Structures

Additionally, or alternatively, in a third exemplary data structure, S220 may function to construct one or more digital event data corpora (e.g., one or more digital event data structures) that may index the distinct digital event metadata features extracted by S210 based on a type of the extracted piece of digital event metadata. For instance, in a nonlimiting example, the digital event data corpus may include a first set of distinct digital event attributes (e.g., one or more distinct IP-based digital event attributes, a plurality of distinct IP-based digital event attributes, or the like) that may correspond to a first type of digital event metadata (e.g., IP-type metadata) and indexed (e.g., digitally mapped or electronically linked) according to the first type of digital event metadata.

Additionally, or alternatively, the digital event data corpus may include a second set of distinct digital event attributes (e.g., one or more distinct phone number-based digital event attributes, a plurality of distinct phone number-based digital event attributes, or the like) that may correspond to a second type of digital event metadata (e.g., phone number-type metadata) and indexed (e.g., digitally mapped or electronically linked) according to the second type of digital event metadata.

Additionally, or alternatively, the digital event data corpus may include a third set of distinct digital event attributes (e.g., one or more distinct user-based digital event attributes, a plurality of distinct user-based digital event attributes, or the like) that may correspond to a third type of digital event metadata (e.g., user-type metadata) and indexed (e.g., digitally mapped or electronically linked) according to the third type of digital event metadata.

Additionally, or alternatively, the digital event data corpus may include a fourth set of distinct digital event attributes (e.g., one or more distinct address-based digital event attributes, a plurality of distinct address-based digital event attributes, or the like) that may correspond to a fourth type of digital event metadata (e.g., address-type metadata) that may be indexed (e.g., digitally mapped or electronically linked) according to the fourth type of digital event metadata.

Additionally, or alternatively, the digital event data corpus may include a fifth set of distinct digital event attributes (e.g., one or more distinct email-based digital event attributes, a plurality of distinct email-based digital event attributes, or the like) that may correspond to a fifth type of digital event metadata (e.g., email-type metadata) and indexed (e.g., digitally mapped or electronically linked) according to the fifth type of digital event metadata.

Additionally, or alternatively, the digital event data corpus may include a sixth set of distinct digital event attributes (e.g., one or more distinct credit card-based digital event attributes, a plurality of distinct credit card-based digital event attributes, or the like) that may correspond to a sixth type of digital event metadata (e.g., credit card-type metadata) and indexed (e.g., digitally mapped or electronically linked) according to the sixth type of digital event metadata.

Additionally, or alternatively, the digital event data corpus may include a seventh set of distinct digital event attributes (e.g., one or more distinct order-based digital event attributes, a plurality of distinct order-based digital event attributes, or the like) that may correspond to a seventh type of digital event metadata (e.g., order-type digital events) and indexed (e.g., digitally mapped or electronically linked) according to the seventh type of digital event metadata.

It shall be noted that the data structures constructed by S220 may be different in other embodiments without departing from the scope of the claimed invention.

2.30 Constructing a Digital Event Feature-Based Backbone Network Graph

S230, which includes constructing a digital event feature-based backbone network graph, may function to generate a digital event feature-based backbone network graph based on the digital event data samples sourced by S210 and/or the one or more digital event data structures constructed by S220. In one or more preferred embodiments, S230 may function to input one or more of the constructed digital event data structures into a graph-based construction algorithm to automatically construct or generate, by one or more computers of the machine learning-based digital threat mitigation platform, a multi-dimensional graphical structure comprising a plurality of nodes and a plurality of edges. It shall be noted that a digital event feature-based backbone network graph may also be referred to herein as a "backbone network graph" or a "backbone graph."

In one or more embodiments, S230 may function to construct a backbone network graph in accordance with a target graph schema data structure of a plurality of distinct graph schema data structures based on the plurality of distinct digital event data samples sourced by S210 and/or the digital event data structures satisfying one or more characteristics of the target graph schema data structure. A graph schema data structure, as generally referred to herein, may be stored in computer memory that may include a structure of the contents of a graph database (e.g., the type of entities, vertices, and edges) and optionally a description of the contents of the graph database. Accordingly, in one or more embodiments, each graph schema data structure of the plurality of graph schema data structures may include graph-rendering computer instructions that, when executed on the sourced digital event data samples or the extracted features of the sourced digital event data may function to automatically construct or generate a backbone network graph (in accordance with the graph schema data structure) comprising one or more distinct nodes of one or more distinct node types and one or more distinct edges graphically connecting the one or more distinct nodes of the one or more distinct node types.

A graphical node, as generally referred to herein, may be a graphical representation of a fundamental unit that may be configured to store or encoded with a distinct value or property (e.g., a distinct piece of digital event metadata). An edge, as generally referred to herein, may represent a graphical connection (or link or relation) between a distinct pair of graphical nodes.

Accordingly, in one or more embodiments, based on input of the one or more constructed digital event data structures, S230 may function to construct (or beginning graphically constructing) a plurality of distinct graphical nodes of one or more node types and a plurality of distinct graphical edges of one or more edge types to generate the backbone network graph. In one or more embodiments, a derivation of the backbone graph may be based on one or more IP-indexed data structures in which each distinct IP address from the digital event data may be indexed and associated with one or multiple user identifiers or user accounts. In one or more embodiments, the backbone graph may function to graphically connect two or more IP addresses (e.g., two or more nodes, two or more IP nodes) to one another, via a graphical edge, by identifying a plurality of the same (or substantially similar) users acting on the two or more IP addresses.

Additionally, or alternatively, in one or more embodiments, a derivation of the backbone graph may be based on executing the graph-rendering computer instructions on the one or more digital event data structures to generate the backbone graph. In one or more embodiments, the backbone network graph may function to graphically connect two or more IP addresses (e.g., two or more nodes, two or more IP nodes) to one another, via a graphical edge, by identifying a plurality of the same (or substantially similar) users acting on the two or more IP addresses.

In one implementation, S230 may function to construct an IP-based backbone graph in which IP addresses are nodes and a number of shared users creates a graphical edge between IP nodes based on a pairwise analysis and/or evaluation of IP nodes. That is, S230 may function to iterate through distinct pairs of IP nodes to identify whether each distinct pair of IP nodes share at least one common user or user account that may have used both IP addresses of the pair over some period.

That is, in one or more embodiments, the backbone graph may function to graphically associate (or assign) each of the plurality of nodes with a distinct location-type event attribute, such as, an IP address, a shipping address, a billing address, or the like. In the same or one or more alternative embodiments, a plurality of edges may be constructed on the backbone graph when a common event attribute (e.g., a plurality of users) may be associated with a pair of nodes (e.g., at least two nodes). Stated another way, in one or more implementations, the backbone graph may be configured to graphically illustrate a relationship between corresponding IP addresses (e.g., location-type event attributes) and users and/or user IDs (e.g., user-type event attributes).

In another implementation, a derivation of the backbone graph may be based on executing the graph-rendering computer instructions that may function to derive relationships (e.g., graphical edges) between a plurality of distinct nodes (e.g., a plurality of distinct features) of a plurality of distinct node types associated with a graph schema data structure. In one or more embodiments of such implementation, S230 may function to construct a backbone network graph that may include a plurality of sub-backbone graphs. For example, in a nonlimiting example, the backbone graph may include n number of sub-backbone graphs, such as the exemplary sub-backbone network graphs of FIGS. 7-9. It shall be noted that each distinct graphical node of the backbone network graph may be encoded with (or may be configured to store) a distinct value or property corresponding to the graphical node type (e.g., a distinct user-type graphical node may be encoded with a distinct user ID, a distinct phone number-type graphical node may correspond to a distinct phone number, etc.).

Shared Edge Threshold Between Backbone Nodes

In one or more embodiments, to prevent construction of a graphical edge when a pair of graphical nodes share a single digital event attribute or a small number of digital event attributes of a target type (e.g., relatively small number of users, relatively small number of user devices, etc.), S230 may function to restrict constructing an edge on the backbone graph until a predetermined number of distinct pieces metadata of the target type (e.g., a predetermined number of common users, a predetermined number of user devices, etc.) are associated with the pair of nodes.

For instance, in a non-limiting example, S230 may function to implement a shared-edge threshold that may restrict construction of a graphical edge between a graphical node pair unless a predetermined number of common users (e.g., more than five, more than ten, more than fifteen, more than twenty, more than one hundred, etc.) are associated with the graphical node pair. Stated differently, in one or more embodiments, S230 may function to implement a node-pairing threshold that sets a minimum number of shared digital event attributes of a target type (e.g., shared users or user-based attributes) that, when satisfied, enables a creation of a connection or graphical edge between two distinct IPs or the like. Additionally, or optionally, the shared-edge threshold may be tunable to increase or decrease the measure of similar users between nodes (e.g., connection strength).

It shall be noted that, in one or more embodiments, the node-paring threshold may be applied to other types and/or combinations of the above-mentioned metadata features in analogous ways.

It shall be further noted that as the digital event data of S210 may be identified in real-time, the backbone graph may continue to update, in real-time, based on real-time (or inbound) digital event data of S210. For example, at one moment in time, an edge may not exist between two graphical nodes (or IP nodes), however, at another moment in time, the edge may exist between the two nodes (or the two IP nodes) as the shared-edge threshold may have been satisfied. Stated another way, the backbone graph, may continuously evolve to account for the most up-to-date event data, which may include constructing (or generating) new graphical nodes and graphical edges.

Time Element of the Backbone Network Graph

Additionally, or alternatively, S230 may function to account for the temporal dimension when constructing the backbone network graph. That is, in addition to static connections between location-type event attributes (e.g., IP addresses, or the like) and user-type event attributes (e.g., users, user ID, etc.), S230 may further function to construct the backbone graph based on one or more time-based parameters.

For example, in addition, to the shared-edge threshold, S230 may further function to implement a tunable temporal threshold that may limit construction of a graphical edge between a pair of graphical nodes, unless the users and/or user IDs associated with the IP addresses are within the temporal threshold (e.g., less than one day, less than one week, less than one month, etc.).

At least one technical benefit of accounting for both the static threshold and the temporal threshold may prevent false positives of users utilizing corporate virtual private networks (VPNs) or the like. That is, the temporal threshold may increase or improve a confidence or a probability that two or more graphical nodes are connected to one another as a plurality of users and/or user IDs may be sharing multiple IP addresses within an abbreviated and/or an abnormal time window.

It shall be noted that, in one or more embodiments, the tunable temporal threshold may be applied to other types and/or combinations of the above-mentioned metadata features in analogous ways.

It shall be noted that the time component (e.g., temporal threshold) of the backbone graph, and in particular, the edge may be visually illustrated on the backbone graph, by modifying (e.g., increasing or decreasing) a length of the edge, a thickness of the edge, or a color intensity of the edge.

2.40 Deriving Connected Components Based on the Backbone Network Graph|Partitioning the Backbone Network Graph S240, which includes evaluating the backbone network graph, may function to partition (or slice) the backbone network graph into one or more (or a plurality of) sub-backbone network graphs (or distinct clusters of networked nodes) derived from the backbone network graph, as shown generally by way of example in FIG. 3 and FIGS. 7-10. Preferably, in one or more embodiments, the partitioning of the backbone graph for deriving one or more connected-component graphs (e.g., one or more distinct clusters of networked nodes) includes a temporal partitioning. That is, S240 may function to partition the digital event feature-based backbone network graph (e.g., an IP-based backbone graph, etc.) based on time windows or periods of time (e.g., past 24 hours, past 30 days, etc.), such that only those IPs or the digital event metadata used within the time window or periods may be extracted and used in creating and/or deriving a connected component graph.

A sub-backbone network graph, as generally defined herein, may be a lesser portion of the backbone graph that includes a collection of distinct graphical nodes of one or more node types (e.g., IP-type nodes, user-types nodes, order-type nodes, address-type nodes, phone number-type nodes, email address-type nodes, credit card-type nodes) that may be graphically connected together by one or more distinct edges. Stated differently, a first subgraph of the backbone graph may include a distinct cluster of networked IP nodes in which the distinct cluster of networked IP nodes may not share a connection with another distinct cluster of networked IP nodes from another distinct subgraph of the backbone graph.

Figure 7:
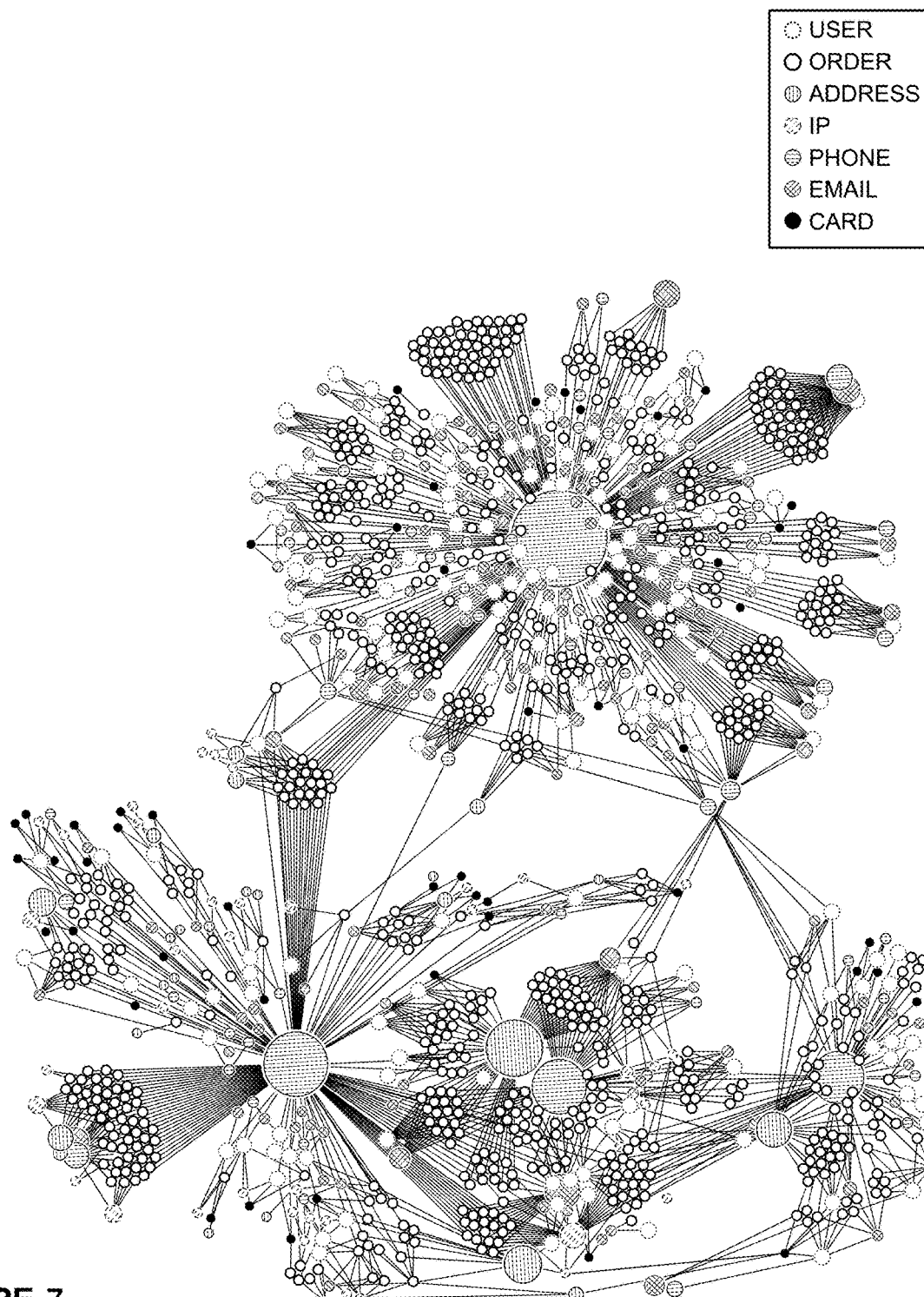
FIG. 7 illustrates an exemplary representation of a cluster of networked nodes in accordance with one or more embodiments of the present application.

In one or more embodiments, S240 may function to display, on a web-based user interface, a target sub-backbone network graph (or a target cluster of distinct networked nodes) derived from the backbone network graph, as shown generally by way of example in FIG. 7. Accordingly, in one or more embodiments, S240 may function to receive a user input via the user interface indicating a selection of a target graphical node included in the target sub-backbone graph, and in response to the user input, S240 may function to selectively emphasize (e.g., increase node size, increase node edge thickness, increase edge thickness, or the like) the graphical nodes corresponding to one or more target node types of the plurality of graphical node types graphically connected to the target graphical node, as shown generally by way of example in FIG. 8-FIG. 10.

Figure 8:
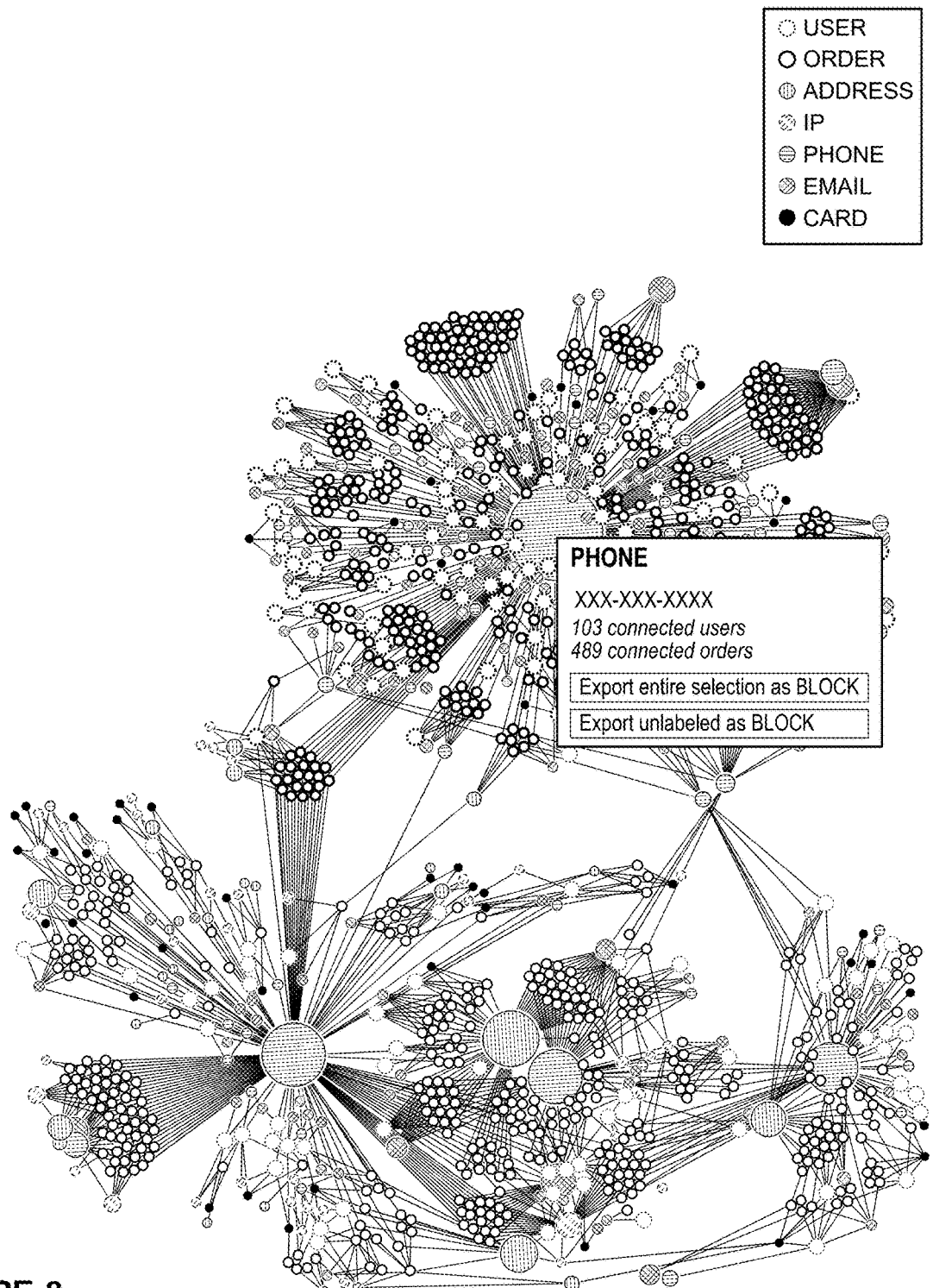
FIG. 8 illustrates an exemplary representation of a target node associated with a cluster of networked nodes displaying a user interface object in accordance with one or more embodiments of the present application.
Figure 9:
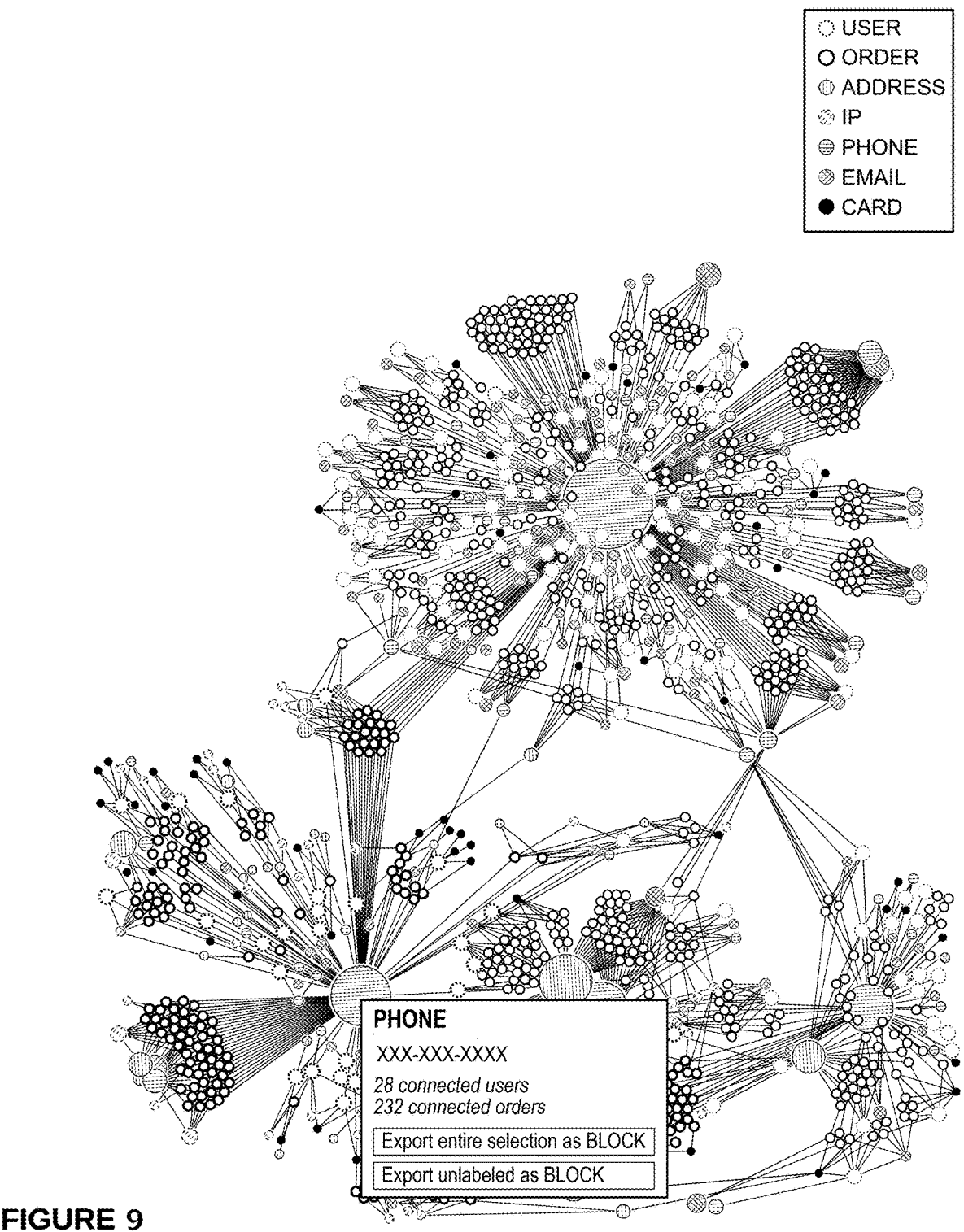
FIG. 9 illustrates an exemplary representation of a target node associated with a cluster of networked nodes displaying a user interface object in accordance with one or more embodiments of the present application.
Figure 10:
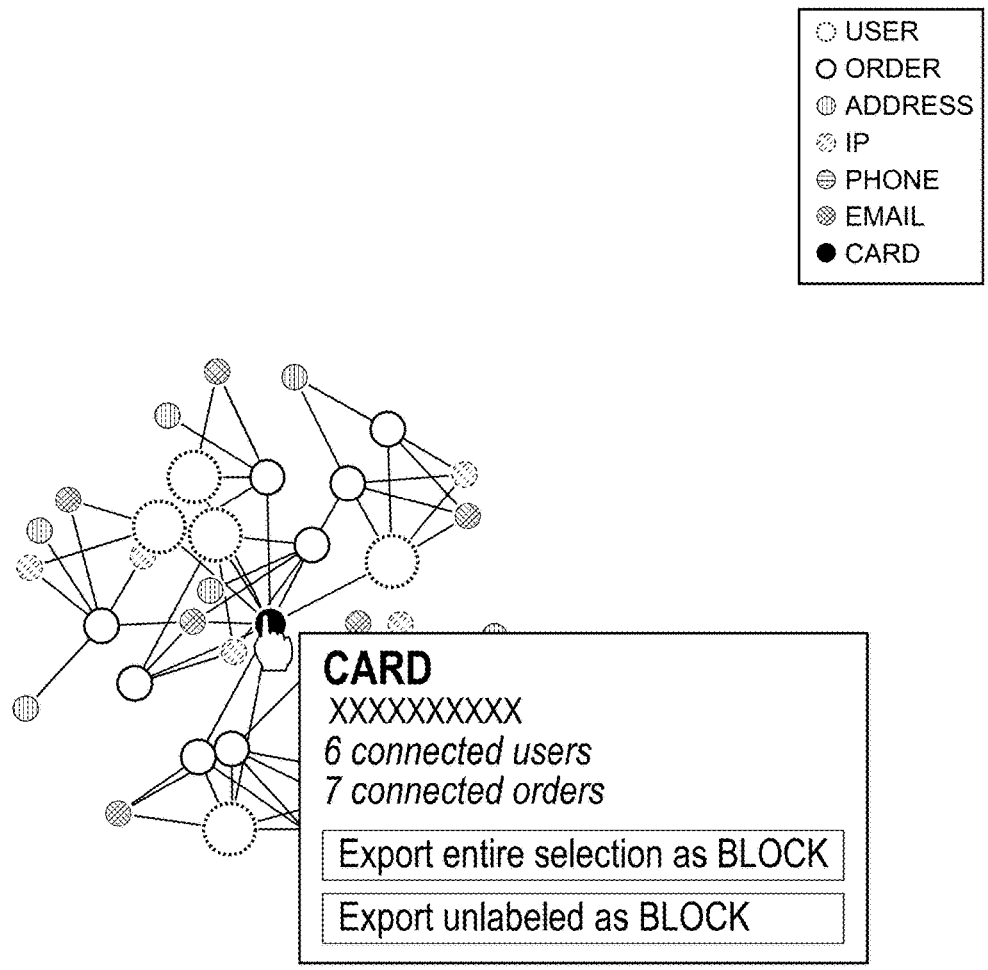
FIG. 10 illustrates an exemplary representation of a target node associated with a cluster of networked nodes displaying a user interface object based on receiving user input in accordance with one or more embodiments of the present application.

Additionally, or alternatively, in one or more embodiments, in response to the user input, S240 may additionally function to display a user interface object that may include a feature value (e.g., a credit card number, a phone number value, a shipping address value, etc.) encoded within the selected graphical node and a quantity of distinct feature values of one or more distinct graphical node types of the plurality of distinct graphical node types graphically connected to the target graphical node, as shown generally by way of example in FIG. 8, FIG. 9, and FIG. 10.

Identifying Clustered Components Based on the Backbone Graph

In one or more preferred embodiments, S240 includes S242, which may function to evaluate and/or expand a partition or subgraph of the backbone graph to identify one or more clusters of components (e.g., clusters of users, clusters of credit cards, clusters of orders, etc.) associated with the partition or subgraph.

In a first implementation, S230 may function to identify a target connected component cluster (or a subgraph of the backbone network graph) based on searching or querying the backbone network with one or more target digital event attributes (e.g., a phone number, an email address, an IP address, etc.). That is, the target connected component cluster may be returned based on the search or query because the one or more target digital event attributes may be included in the target connected component cluster. It shall be noted that in such implementation, the target connected component cluster may optionally be displayed on a web-based user interface of the digital threat mitigation service and may include a connected representation of digital event data associated with a single subscriber or a plurality of distinct subscribers to the digital threat mitigation service, as shown generally by way of example in FIG. 3.

In a second implementation, S240 may function to construct a search query comprising feature-derived search parameters and execute the search query, by one or more computers, to identify one or more (or a plurality of) sub-backbone graphs or clusters of networked nodes that satisfy the feature-derived search parameters. Accordingly, based on the executed search query, S240 may function to identify clusters of networked nodes (or subgraphs of the backbone network graph) that may include graphically connected digital event data. For instance, in a non-limiting example, the results of the search query may identify a subgraph of the backbone network graph that may include a plurality unlabeled digital event data samples and/or a plurality of labeled digital event of a first metadata type digitally associated with a distinct digital event attribute of a second metadata type (e.g., a plurality of distinct user identification values (e.g., a plurality of distinct user-type nodes) digitally linked to a single, distinct credit card number (e.g., single, distinct credit card-type node), a plurality of distinct user identification values (e.g., a plurality of distinct user-type nodes) digitally linked to a single, distinct email address (e.g., single email address-type node), a plurality of distinct user emails (e.g., a plurality of distinct email-type nodes) digitally linked to a single, distinct telephone number (e.g., single, distinct telephone node), etc.).

In one or more embodiments, S242 may function to expand a temporally partitioned subgraph of the backbone graph to define a temporally-associated cluster of users (or user identifiers, user accounts, etc.) that may have been active on the plurality of IPs within the subgraph.

In one or more embodiments, S242 may function to expand the subgraph based on referencing one or more of the user-indexed or the IP-indexed associative data structures together with timestamp data. In such embodiments, S242 may function to decompose each shared edge between pairs of IPs within the subgraph to extract the respective users defining the shared edge. In this way, if a shared edge between a pair of IPs represents a set of number of users (e.g., 15+ users) that have shared the pair of IPs over a time window, S242 may function to distinctly identify each of the (15+) users as being part of the temporally associated cluster of users.

Connected Component (User) Transformation

Additionally, or alternatively, S240 includes S244, which may function to transform a temporally-associated cluster of components derived from a subgraph of the backbone graph to a connected-component graph.

In a preferred implementation, S244 may function to implement a connected-component algorithm (e.g., a connected-user algorithm) that may function to establish connections or edges between pairs of graphical nodes based on a shared attribute and in accordance with a graph schema, for example, IPs between pairs of components within the cluster of components.

Figure 4:
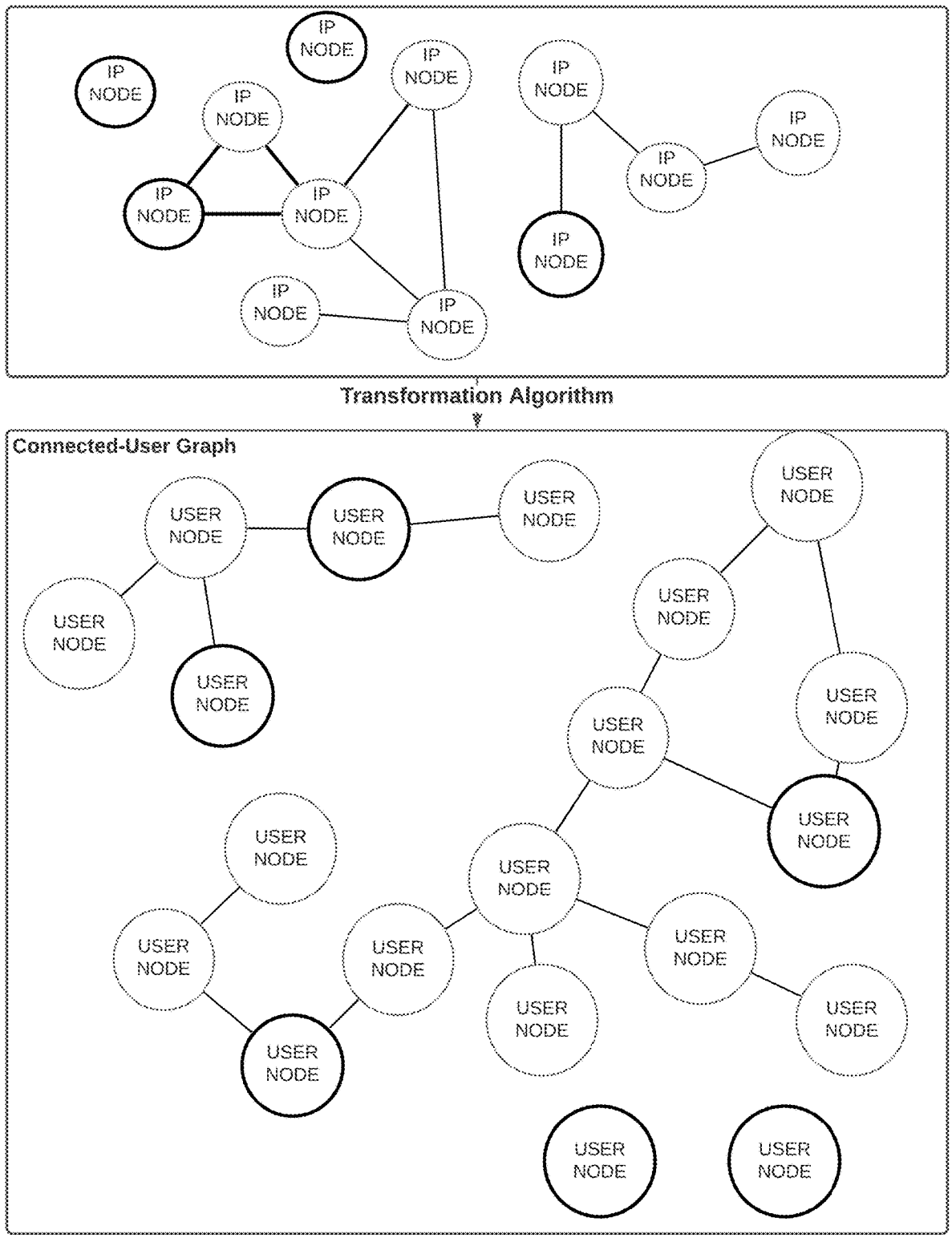
FIG. 4 illustrates an exemplary representation of transforming a backbone network graph and/or one or more subgraphs of the backbone network graph in accordance with one or more embodiments of the present application.

Accordingly, in one or more implementations in which the cluster of components comprises a cluster of users, S244 may function to convert or transform the cluster of users to a connected-user graph based on establishing connections between pairs of users within the cluster of users that have shared or used a common IP address, as shown by way of example in FIG. 4. In this implementation, users identified within a cluster of users, based on an application of the connected-user algorithm, may be represented as (graphical) nodes and edges between pairs of distinct users, that may further function to represent at least one IP address associated with a distinct pair of users over a defined period.

In operation, an application of a connected-user algorithm may function to transform a subgraph of the backbone graph, which may be defined by IP nodes sharing user-based edges, to a connected-user graph in which each distinct user may be represented as a node and the shared IP addresses between users may be represented as edges. Thus, the connected-user algorithm may function to flip the graphical representation scheme of the subgraph to reveal insights about users operating over the IPs of the subgraph.

In one or more embodiments, the user-based connected component graph may be used to understand the relationship between how users are connected by IP addresses, rather than how IP addresses are connected by users. Therefore, in one or more embodiments, S244 may function to set a tunable IP threshold that requires a predetermined number of distinct IP addresses to be shared between at least two user nodes before an edge is constructed (or links) the two user nodes to one another. In operation, the tunable IP threshold may be modified to increase or decrease the connection strength (e.g., the predetermined number of distinct IP addresses) between two nodes.

2.50 Deploying the Backbone Network Graph and/or the Connected Component Graph

S250, which includes utilizing at least one of the backbone network graph, and/or the user-connected component graph, may function to be deployed in various phases of dynamic digital fraud detection and/or advanced digital fraud prevention. In one or more embodiments, the backbone graph and/or the user-connected component graph may support global labeling, training data curation, and/or early detection of large-scale network fraud attacks.

Advanced Threat Detection of Large-Scale Network Fraud Attacks

Figure 5:
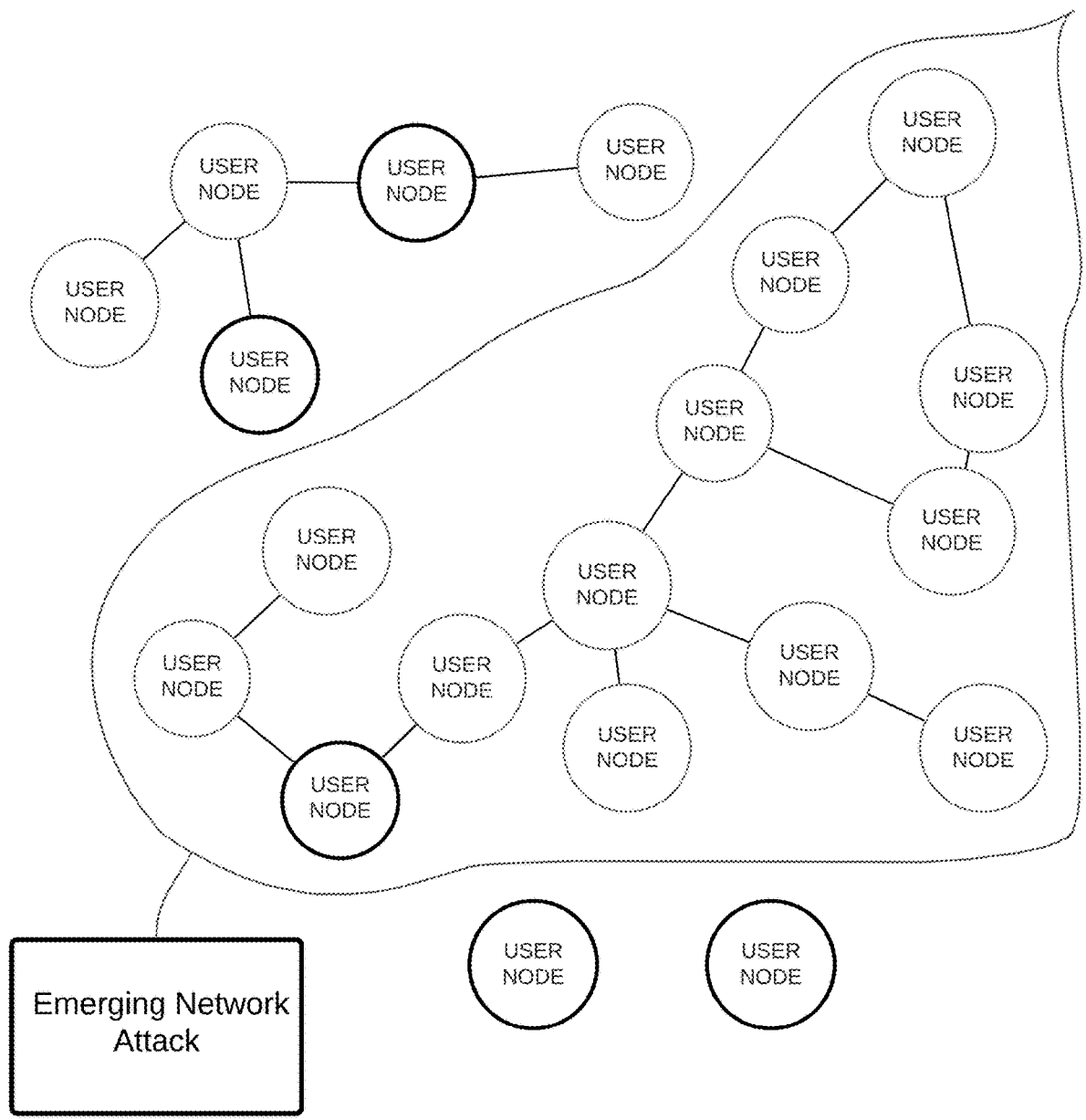
FIG. 5 illustrates an exemplary representation of identifying large-scale network fraud attacks in accordance with one or more embodiments of the present application.

In one or more embodiments, S250 may function to implement the backbone network graph and/or the user-connected component graph to detect and/or prevent large-scale network fraud attacks, as shown generally by way of example in FIG. 5. For instance, a system (e.g., the system 100) implementing the method 200 may be configured to count and/or track the addition of newly constructed nodes and/or edges in the backbone graph and/or the user-connected component graph. In operation, the system 100 implementing the method 200, may function to observe the number of edges constructed as a function of time across a plurality of subscribers or for an individual subscriber to inform one or more (e.g., automated) threat mitigation actions.

In a first implementation, S250 may function to observe the number of edges constructed according to a time interval (e.g., one hour, one day, etc.). For instance, in a preferred embodiment, S250 may function to track (or count) the number of newly constructed edges over a time interval period, which may indicate a potential formation of a coordinated grouping of users that may have or that may be (in real-time or near real-time) performing one or more fraud attacks.

Accordingly, at least one technical benefit of counting or tracking the number of constructed edges over the predetermined time interval, may allow early identification or detection of large-scale network fraud attacks (e.g., botnet attacks) upon a determination of a significant (or abnormal) increase in the number of constructed edges within the time interval. For instance, in a non-limiting example, S250 may function to identify a distinct cluster of networked nodes based on a large volume of newly, constructed graphical edges being constructed within the distinct cluster of networked nodes within a predetermined time span and identify/label the distinct cluster of networked nodes as an emerging network fraud attack based on the plurality of newly, constructed graphical edges exceeding a service-defined edge creation count. Accordingly, S250 may function to executing one or more digital threat mitigation actions that may prevent one or more future digital events from being processed to completion on the one or more online services if one or more pieces of metadata of the one or more future digital events is equivalent to a piece of metadata included in the distinct cluster of networked nodes associated with digital abuse.

In a second implementation, S250 may function to observe the number of users within a target cluster or user-connected component graph as a function of time. For instance, S250 may function to observe the number of users within the target cluster according to a time interval (e.g., one hour, one day, etc.). That is, in a preferred embodiment, S250 may function to track (or count) the number of newly connected users within a target cluster. At least one technical benefit of counting or tracking the number of users within a target cluster over a predetermined time interval, may allow early identification or detection of large-scale network fraud attacks (e.g., botnet attacks) upon a determination of a significant (or abnormal) increase in the number of distinct users within a target cluster (e.g., connected component) within the time interval.

It shall be noted that, in one or more embodiments, an identification of a network of connected users within a given user-connected component graph or the like together with one or more threat detection heuristics may be used to detect one or more potential large-scale network fraud attacks. For instance, in a non-limiting example, when a network of connected users is detected, S250 may function to evaluate the one or more users within the network for potential attack signals, such as credential stuffing. In such non-example, credential stuffing for purposes of misappropriate a legitimate user account may be a leading indicator that the one or more users may intend to coordinate a use of misappropriated accounts (e.g., account takeover) for making fraudulent purchases.

Global Labeling

In a preferred embodiment, S250 may function to utilize at least one of the backbone graph and/or the user-connected component graph or the like for global or bulk labeling of subscriber event data in-bulk, rather than on a per-event basis and/or per-subscriber basis. For instance, in a non-limiting example, S250 may function to (bulk) or global label each digital event (or the plurality of digital event metadata) within a target cluster, rather than individually. Additionally, in one or more embodiments, S250 may function to label a specific digital fraud type or digital abuse type for the target cluster, such as, an Account Takeover fraud-type label, a Credential Stuffing fraud-type label, a Payment abuse fraud-type label to further enhance or classify the identified event data of S210.

In one or more embodiments, S250 may function to utilize the backbone graph and/or the user-connected component graph as a global labeling tool for automated bulk labeling of users and/or events that may provide at least one of a digital fraud analyst and/or a system (e.g., the system 100 implementing the method 200) increased data labeling efficiency. For example, in one embodiment, based on identification of a connected component (e.g., an IP-connected component graph, a user-connected component graph, a subgraph of the backbone network graph, a distinct cluster of networked nodes of one or more distinct node types, or the like), S250 may function to sample a predetermined number of users from the connected component to a human engineer for analysis, and in accordance with a determination that the majority or all users sampled appear to be malicious, S250 may function to label the entire connected component or cluster (and all the associated nodes) with a corresponding label (e.g., a block label). For instance, with continued reference to the above non-limiting example, the user interface object may include one or more selectable objects that, when selected, may perform an automated bulk labeling action of all graphical nodes or at least all distinct graphical nodes of a target node type.

Additionally, or alternatively, after validation (or confirmation) from the human engineer that the sampled users appear malicious, S250 may function to automatically trace (or link or propagate or extrapolate) all user sessions associated with the confirmed malicious IP address across all subscribers utilizing the system 100 and/or the method 200 and assign a corresponding label. Therefore, at least one technical benefit of global labeling event data may reduce the burden of individually labeling event data that may have originated from a known malicious digital event metadata feature, such as, a malicious IP address, a plurality of known malicious IP addresses, a comprised credit card value, etc.

Accordingly, based on identification of a global labeling decision, S250 may optionally function to provide metrics to the human engineer to inform how subscribers are affected by the global labeling decision. For instance, one metric may be to identify how many users and/or IP addresses were blocked from each online resources of the one or more subscribers based on the global labeling decision. In the same or alternative embodiment, another metric may be to analytically quantify the number of users associated with at least one of the backbone graph, the IP-connected component graph, and/or the user-connected component graph. It shall be recognized that any metric may be provided to the human labeling analyst and/or the subscribers to analytically express the global labeling decision and/or provide data insights associated with the one or more graphical structures.

Training Data Curation

As described above, the backbone network graph, the IP-connected component graph, and/or the user-connected component graph or the like may streamline or automate the labeling of the identified digital event data of S210. In a preferred embodiment, the now labeled digital event data may provide for more efficient data compilation for creating effective training corpora for training one or more machine learning models of the digital threat mitigation platform. Therefore, in addition to increasing data labeling efficiencies via the global labeling tool, the labeled event data may further aid in beneficially training one or more machine learning models.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed:

1. A method for fast-detection and mitigation of emerging network fraud attacks implemented via a machine learning-based digital threat mitigation platform, the method comprising:

sourcing, from one or more digital event data corpora, a plurality of distinct digital event data samples associated with one or more online services;

executing, by one or more computers, graph-rendering computer instructions that automatically construct a digital event feature-based backbone network graph (backbone network graph) using a subset of features extracted from the plurality of distinct digital event data samples, wherein the constructing includes:
- (i) identifying, as graphical nodes of the backbone network graph, a first plurality of distinct features of the subset of features;
- (ii) identifying, as graphical edges of the backbone network graph, a second plurality of distinct features of the subset of features;
- (iii) generating a graphical edge between distinct pairs of graphical nodes comprising a same type of feature of the subset of features based on feature values associated with at least one distinct feature of the second plurality of distinct features, wherein the graphical edge is generated between a target pair of graphical nodes of the distinct pairs of graphical nodes if a feature value of the at least one distinct feature satisfies a node-pairing threshold;

exposing a distinct cluster of networked nodes comprising a subset of the backbone network graph based on feature-derived search parameters; and mitigating one or more digital threats, via executing one or more digital threat mitigation actions, if one or more emerging network fraud attacks is identified based on an assessment of the distinct cluster of networked nodes.

2. The method according to claim 1, further comprising displaying, on a web-based user interface, the distinct cluster of networked nodes; and while displaying the distinct cluster of networked nodes:
receiving a user input selecting a target graphical node of the distinct cluster of networked nodes;
in response to receiving the user input, displaying a user interface object that includes:
- (a) a feature value encoded within the target graphical node, and
- (b) a quantity of distinct feature values of a first feature type of the first plurality of distinct features graphically connected to the target graphical node.

3. The method according to claim 2, wherein the user interface object further includes a selectable option, the method further comprising:
receiving a second user input selecting the selectable option; and
in response to receiving the second user input:
automatically assigning a classification label indicating digital abuse to at least a subset of the first plurality of distinct features associated with one or more graphical nodes graphically connected to the target graphical node.

4. The method according to claim 3, further comprising: based on receiving the second user input:
preventing one or more future digital events from being processed to completion on the one or more online services if one or more pieces of metadata of the one or more future digital events is equivalent to one of the distinct features of the subset having the classification label indicating digital abuse.

5. The method according to claim 1, wherein the first plurality of distinct features of the subset of features are distinct from the second plurality of distinct features of the subset of features.

6. The method according to claim 1, wherein identifying the first plurality of distinct features of the subset of features includes:
- (1) identifying distinct internet protocol-based features of the subset of features to be represented as distinct IP-type graphical nodes in the backbone network graph;
- (2) identifying distinct user identification-based features of the subset of features to be represented as distinct user-type graphical nodes in the backbone network graph;
- (3) identifying distinct phone number-based features of the subset of features to be represented as distinct phone number-type graphical nodes in the backbone network graph;
- (4) identifying distinct email address-based feature of the subset of features to be represented as distinct email-type graphical nodes in the backbone network graph;
- (5) identifying distinct physical address-based features of the subset of features to be represented as distinct address-type graphical nodes in the backbone network graph;
- (6) identifying distinct payment method-based features of the subset of features to be represented as distinct payment method-type graphical nodes in the backbone network graph; and
- (7) identifying distinct order transaction-based features of the subset of features to be represented as distinct order-type graphical nodes in the backbone network graph.

7. The method according to claim 1, wherein the distinct cluster of networked nodes includes (a) one or more distinct graphical nodes of a first feature type, (b) one or more distinct graphical nodes of a second feature type, (c) one or more distinct graphical nodes of a third feature type, the method further comprising:
displaying, on a web-based user interface, the distinct cluster of networked nodes; and
while displaying the distinct cluster of networked nodes:
receiving a user input selecting a target graphical node included in the distinct cluster of networked nodes; and
in response to receiving the user input, visually emphasizing the one or more distinct graphical nodes of the first feature type graphically connected to the target graphical node.

8. The method according to claim 1, wherein identifying the distinct cluster of networked nodes includes constructing a cluster search query comprising the feature-derived search parameters and executing the search query.

9. The method according to claim 1, wherein the distinct cluster of networked nodes includes a distinct graphical node of a first feature type encoded with a distinct feature value associated with the first feature type that is graphically connected to a plurality of distinct graphical nodes of a second feature type, wherein each of the plurality of distinct graphical nodes of the second feature type is encoded with a distinct feature value associated with the second feature type.

10. A method for fast-detection and mitigation of emerging network fraud attacks implemented via a machine learning-based digital threat mitigation platform, the method comprising:

sourcing, from one or more digital event data corpora, a plurality of distinct digital event data samples that occurred on one or more online services of a target subscriber;

identifying a graph schema data structure of a plurality of distinct graph schema data structures based on the plurality of distinct digital event data samples satisfying one or more characteristics of the graph schema data structure, wherein the graph schema data structure includes a set of graph-rendering computer instructions for constructing a digital event feature-based backbone network graph;

automatically constructing, by one or more computers, the digital event feature-based backbone network graph by executing the set of graph-rendering computer instructions of the graph schema data structure on the plurality of distinct digital event data samples, wherein the constructing includes:

(i) selectively extracting a distinct set of feature values from each of the plurality of distinct digital event data samples, wherein each extracted feature value of each distinct set of feature values corresponds to one of a plurality of distinct node types defined by the graph schema data structure;

(ii) generating a plurality of distinct graphical nodes for each distinct node type of the graph schema data structure based on the distinct sets of feature values;

(iii) generating a plurality of graphical edges that graphically connects selective subsets of the plurality of distinct graphical nodes of distinct node types together in accordance with the graph schema data structure;

identifying a distinct cluster of networked nodes comprising a subset of the backbone network graph; and mitigating, via executing one or more digital threat mitigation actions, if an emerging network fraud attack is identified based on an assessment of the distinct cluster of networked nodes.

11. The method according to claim 10, wherein automatically constructing the digital event feature-based backbone network graph occurs at a first period; and identifying the distinct cluster of networked nodes occurs at a second period, distinct from the first period.

12. The method according to claim 11, wherein the distinct cluster of networked nodes is identified based on a plurality of new graphical edges being constructed within the distinct cluster of networked nodes within a predetermined time span; and the distinct cluster of networked nodes is identified as an emerging network fraud attack based on the plurality of new graphical edges exceeding a service-defined edge creation count.

13. The method according to claim 10, wherein the distinct cluster of networked nodes includes (a) a plurality of graphical nodes of a first type, (b) a plurality of graphical nodes of a second type; and a plurality of graphical nodes of a third type, the method further comprising:

displaying, on a web-based user interface, the distinct cluster of networked nodes; and while displaying the distinct cluster of networked nodes:
receiving a user input selecting a target graphical node included in the distinct cluster of networked nodes;

in response to receiving the user input, visually emphasizing the plurality of graphical nodes of the first type connected to the target graphical node.

14. The method according to claim 10, wherein the graph schema data structure includes representing:

distinct internet protocol-based features of the plurality of distinct digital event data samples as distinct IP-type graphical nodes, distinct user identification-based features of the plurality of distinct digital event data samples as distinct user-type graphical nodes, distinct phone number-based features of the plurality of distinct digital event data samples as distinct phone number-type graphical nodes, distinct email address-based feature of the plurality of distinct digital event data samples as distinct email-type graphical nodes, distinct physical address-based features of the plurality of distinct digital event data samples as distinct address-type graphical nodes, distinct payment method-based features of the plurality of distinct digital event data samples as distinct payment method-type graphical nodes, and distinct order transaction-based features of the plurality of distinct digital event data samples as distinct order-type graphical nodes.

15. The method according to claim 10, wherein identifying the distinct cluster of networked nodes includes querying the digital event feature-based backbone network graph based on feature-derived search parameters, and the distinct cluster of networked nodes includes a distinct feature value of a first feature type digitally mapped to a plurality of distinct feature values of a second feature type.

16. The method according to claim 10, further comprising displaying, on a web-based user interface, the distinct cluster of networked nodes; and while displaying the distinct cluster of networked nodes:
receiving a user input selecting a target graphical node of a first node type included in the distinct cluster of networked nodes;

in response to receiving the user input, displaying a user interface object that includes:
(a) a feature value encoded within the target graphical node, and
(b) a quantity of distinct feature values of a second node type distinct from the first node type graphically connected to the target graphical node.

17. The method according to claim 16, wherein the distinct cluster of networked nodes is identified as an emerging network fraud attack based on the quantity of distinct feature values of a second node type graphically connected to the target graphical node exceeding a service-defined count threshold.

18. The method according to claim 10, wherein each distinct graphical node of the distinct cluster of networked nodes is encoded or configured to store a distinct feature value.

* * * * *